United States Patent
Salas De Los Rios et al.

(10) Patent No.: US 11,808,171 B2
(45) Date of Patent: Nov. 7, 2023

(54) HYBRIDIZATION OF THE FIBERS OF THE FIBROUS REINFORCEMENT OF A FAN BLADE

(71) Applicant: Safran Aircraft Engines, Paris (FR)

(72) Inventors: Paula Salas De Los Rios, Moissy-Cramayel (FR); Thomas Alain De Gaillard, Moissy-Cramayel (FR); Teddy Fixy, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 59 days.

(21) Appl. No.: 17/637,941

(22) PCT Filed: Aug. 27, 2020

(86) PCT No.: PCT/HR2020/051506
§ 371 (c)(1),
(2) Date: Feb. 24, 2022

(87) PCT Pub. No.: WO2021/038173
PCT Pub. Date: Mar. 4, 2021

(65) Prior Publication Data
US 2022/0364474 A1 Nov. 17, 2022

(30) Foreign Application Priority Data
Aug. 28, 2019 (FR) ...................... 1909468

(51) Int. Cl.
*F01D 5/28* (2006.01)
*F01D 5/14* (2006.01)

(52) U.S. Cl.
CPC ............ *F01D 5/282* (2013.01); *F01D 5/147* (2013.01); *F05D 2220/36* (2013.01);
(Continued)

(58) Field of Classification Search
CPC ......... F01D 5/147; F01D 5/282; B29C 70/24; F04D 29/388
See application file for complete search history.

(56) References Cited

U.S. PATENT DOCUMENTS

| 4,407,885 A | 10/1983 | Murphy et al. |
| 8,062,570 B2 | 11/2011 | Romero et al. |

(Continued)

FOREIGN PATENT DOCUMENTS

| CN | 101169381 A | 4/2008 |
| CN | 102666277 A | 9/2012 |

(Continued)

OTHER PUBLICATIONS

French Preliminary Search Report for French Application No. 1909468, dated Feb. 4, 2020.
(Continued)

*Primary Examiner* — Woody A Lee, Jr.
*Assistant Examiner* — Cameron A Corday
(74) *Attorney, Agent, or Firm* — BIRCH, STEWART, KOLASCH & BIRCH, LLP (57) ABSTRACT

The invention relates to a blade of a fan of a turbomachine, comprising a structure made from composite material, including a fibrous reinforcement obtained by means of the three-dimensional weaving of strands and a matrix in which the fibrous reinforcement is embedded,—the fibrous reinforcement comprising a first portion forming the leading edge and a second portion forming all or part of the trailing edge,—the strands of the fibrous reinforcement comprising first strands having a predetermined elongation at break and second strands having an elongation at break higher than that of the first strands, the first portion comprising all or some of the first strands while the second portion comprises all or some of the second strands.

20 Claims, 5 Drawing Sheets

(52) U.S. Cl.
CPC .. *F05D 2300/501* (2013.01); *F05D 2300/603* (2013.01); *F05D 2300/614* (2013.01)

(56) References Cited

U.S. PATENT DOCUMENTS

| | | | |
|---|---|---|---|
| 11,396,820 B2* | 7/2022 | De Gaillard | B29C 70/24 |
| 2005/0249580 A1 | 11/2005 | Bourget et al. | |
| 2013/0017093 A1 | 1/2013 | Coupe et al. | |
| 2013/0017094 A1* | 1/2013 | Coupe | F01D 5/187 |
| | | | 29/889.71 |
| 2013/0082417 A1 | 4/2013 | Gummel et al. | |
| 2013/0259701 A1 | 10/2013 | Dambrine et al. | |
| 2013/0272893 A1 | 10/2013 | Fabre et al. | |
| 2014/0154092 A1 | 6/2014 | Dahl et al. | |
| 2014/0286765 A1* | 9/2014 | Hoyland | F01D 9/041 |
| | | | 415/200 |
| 2015/0086378 A1 | 3/2015 | Klein et al. | |
| 2017/0326757 A1 | 11/2017 | Marin et al. | |
| 2018/0045207 A1* | 2/2018 | Paquin | B29C 70/08 |
| 2019/0381696 A1 | 12/2019 | Guivarc'h et al. | |

FOREIGN PATENT DOCUMENTS

| | | |
|---|---|---|
| CN | 103124606 A | 5/2013 |
| CN | 103703217 A | 4/2014 |
| CN | 103958835 A | 7/2014 |
| CN | 104271888 A | 1/2015 |
| CN | 107075959 A | 8/2017 |
| CN | 110352119 A | 10/2019 |
| EP | 3 222 815 A1 | 9/2017 |
| EP | 3 406 778 A1 | 11/2018 |
| FR | 2 498 520 A1 | 7/1982 |
| FR | 2 869 074 A1 | 10/2005 |
| FR | 3 040 909 A1 | 3/2017 |
| WO | WO 2013/010979 A2 | 1/2013 |

OTHER PUBLICATIONS

International Search Report for International Application No. PCT/FR2020/051506, dated Jan. 15, 2021.

* cited by examiner

HYBRIDIZATION OF THE FIBERS OF THE FIBROUS REINFORCEMENT OF A FAN BLADE

FIELD OF THE INVENTION

The invention generally relates to the field of turbomachines, and more particularly that of fan blades of these turbomachines and their method of manufacture.

The invention applies more particularly to fan blades of composite material and their interaction with the inlet of the primary stream.

PRIOR ART

Turbomachine blades, and particularly fan blades, undergo large mechanical and thermal stresses and must satisfy strict conditions of weight and bulk. It has therefore been proposed to use blades of a composite material including a fibrous reinforcement densified by a polymer matrix, which are lighter relative to metal blades with equivalent propulsive characteristics and which have satisfactory resistance to heat.

During the certification and the life of an engine, the fan blades are subjected to ingestion of birds and hailstones. However, depending on the type of object impacting the blade (and particularly its size, its mass) and depending on the type of fan (rotation speed and number of blades), the preferred damage initiation and propagation zones are different. The mechanical behavior of the fan blades is therefore optimized during the design phase of the blades to satisfy the certification rules.

Moreover, current designs tend to reduce the thickness of the composite material structure of the blades in the zones of the leading edge, the trailing edge and even over the entire structure in order to improve aerodynamic performance. For the same material and the same stacking law, the capacity of the blade to resist impact is therefore reduced.

DISCLOSURE OF THE INVENTION

One object of the invention is therefore to correct the previously mentioned disadvantages by proposing a fan blade for a turbomachine the ingestion behavior of which is improved.

For this purpose, the invention proposes a fan blade of a turbomachine comprising a structure of composite material comprising a fibrous reinforcement obtained by three-dimensional weaving of strands and a matrix in which the fibrous reinforcement is embedded,
  the structure of composite material comprising a leading edge and a trailing edge,
  the fibrous reinforcement comprising a first portion forming the trailing edge and a second portion forming all or part of the leading edge,
  the strands of the fibrous reinforcement comprising first strands having a predefined elongation at break.

Moreover, the strands of the fibrous reinforcement further comprise second strands having an elongation at break greater than that of the first strands. In addition, the first portion comprises all or part of the first strands, while the second portion comprises all or part of the seconds strands.

Certain preferred but not limiting features of the blade described above are the following, taken individually or in combination:

- the first portion is deprived of second strands and the second portion comprises warp strands and weft strands and the warp strands of the second portion are deprived of first strands.
- the second portion extends at a distance from the tip of the blade.
- the blade further comprises an airfoil with an aerodynamic profile able to extend in an airflow, a root configured to be attached to the disk of the fan and a strut extending between the root and the airfoil, and in which the second portion forms the trailing edge over part of the height of the airfoil.
- the second portion extends over at least 35% of a height of the airfoil, for example between 35% and 100% of the height of the airfoil.
- the fibrous reinforcement further comprises a third portion extending between the first portion and the second portion, a density of the second strands increasing progressively in the third portion from the first portion to the second portion.
- the third portion extends over a distance comprised between 5% and 30% of the height of the airfoil.
- the first and second strands comprise warp strands distributed so as to form warp columns, a percentage, with respect to the total number of warp strands in a warp column of the third portion, of second strands introduced between two columns of immediately adjacent warp strands being equal at most to 30%, and preferably comprised between 5% and 15%.
- the blade further has a plurality of warp planes cutting the warp columns, each warp plane being separated from an immediately adjacent warp plane by a line of weft strands, 30% at most of the warp strands being modified between two immediately adjacent warp planes in the third portion which is intermediate, and preferably comprised between 5% and 15% of the warp strands.
- the blade further comprises a pressure side wall and a suction side wall, in which the second portion of the reinforcement forms at least partly the pressure side wall of the blade, while the suction side wall does not comprise second strands.
- the second portion extends over a portion of chord length comprised between 10% and 50% of the total chord length of the blade, preferably comprised between 20% and 40% of said total chord length.
- the first strands have a Young's modulus greater than the Young's modulus of the second strands.
- the elongation at break of the second strands is comprised between 1.5 and 3 times the elongation at break of the first strands.
- the first strands comprise carbon or aramid fibers the Young's modulus of which is greater than 250 GPa and the elongation at break is comprised between 1.5% and 2.5%.
- the elongation at break of the second strands is comprised between 3% and 6%, preferably between 4% and 5%.
- the second strands comprise glass fibers or basalt fibers.
- the second strands comprise warp yarns.

According to a second aspect, the invention relates to a fan for a turbomachine comprising a plurality of blades as described above.

According to a third aspect, the invention proposes a turbomachine comprising a fan of this type and an aircraft comprising this turbomachine.

DESCRIPTION OF THE FIGURES

Other characteristics, objects and advantages of the invention will be revealed by the description that follows, which is purely illustrative and not limiting, and which must be read with reference to the appended drawings in which.

In all the figures, similar elements carry identical references.

DETAILED DESCRIPTION OF THE INVENTION

In the present application, upstream and downstream are defined relative to the normal flow direction of gas in the fan 1 and through the turbomachine. Moreover, what is called the axis of revolution of the fan 1 is the axis X of radial symmetry of the fan 1. The axial direction corresponds to the direction of the axis X of the fan 1, and a radial direction is a direction perpendicular to this axis and passing through it.

Figure 7:
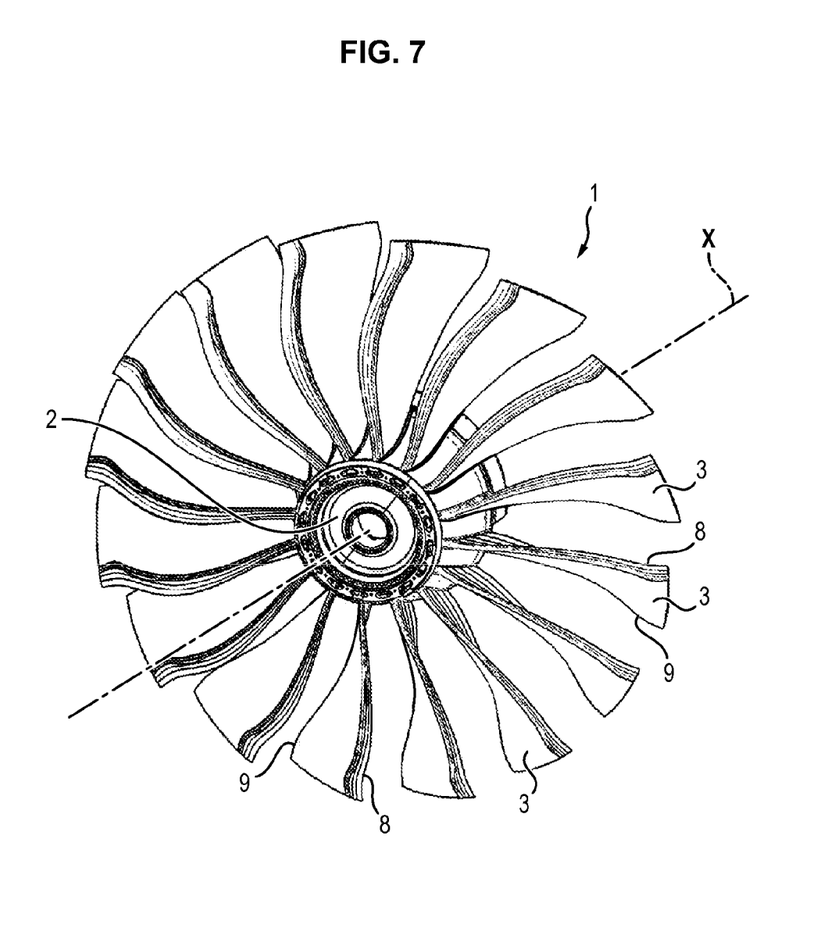
FIG. 7 is a perspective view of an exemplary embodiment of a fan comprising blades according to the invention.

A fan 1 of a turbomachine comprises a fan 1 disk 2 bearing a plurality of fan 1 blades 3 associated with inter-blade platforms.

Each blade 3 comprises a structure of composite material including a fibrous reinforcement 4 obtained by three-dimensional weaving and a matrix in which the fibrous reinforcement 4 is embedded.

This structure of composite material comprises a root 5, a strut 6 and an airfoil 7 with an aerodynamic profile. The root 5 is intended to allow the attachment of the blade to the fan disk 2 and extends for this purpose between a bottom of a recess formed in the disk 2 and the outlet of the depths of the recess. The airfoil 7 with an aerodynamic profile, for its part is able to be placed in an airflow, when the turbomachine is in operation, in order to generate lift. Finally, the strut 6 corresponds to the zone of the airfoil 7 which extends between the root 5 and the airfoil 7, i.e. between the outlet of the depths and the inter-blade platforms.

The blade 3 also comprises, in a manner known per se, a leading edge 8, a trailing edge 9, a pressure side wall I and a suction side wall E. The leading edge 8 is configured to extend facing the flow of gases entering into the turbomachine. It corresponds to the anterior part of an aerodynamic profile which faces the airflow and which divides the airflow into a pressure side flow and a suction side flow. The trailing edge 9, for its part, corresponds to the posterior part of the aerodynamic profile, where the pressure side and suction side flows rejoin.

Finally, the structure is formed from a plurality of blade 3 cross sections stacked from the root 5 along a stacking axis Z extending radially relative to the axis of revolution X of the fan 1.

Hereafter, "height" will designate a distance along the stacking axis Z. Thus, the blade 7 has a height H corresponding to the distance along the stacking axis Z between its lower limit 10, at the intersection with the strut 6, and its tip 11. The height H of the airfoil 7 is measured at the intersection between the leading edge 8 and the lower limit 10 of the blade 7.

The fibrous reinforcement 4 can be formed from a fibrous preform in a single piece obtained by three-dimensional or multilayer weaving with evolving thickness. It comprises warp and weft strands which can in particular includes carbon, glass or basalt, and/or aramid fibers. The matrix, for its part, is typically a polymer matrix, for example epoxy, bismaleimide or polyimide. The blade 3 is then formed by molding by means of a vacuum resin injection method of the RTM (for Resin Transfer Molding) type, or even VARRTM (for Vacuum Resin Transfer Molding).

The strands forming the fibrous reinforcement 4 comprise first strands 12 having a predefined elongation at break and second strands 14 having an elongation at break greater than that of the first strands 12. The fibrous reinforcement 4 is therefore obtained by hybridization of the strands constituting it in order to best use the mechanical properties of each strand depending on the zones of the blade 3 and the type of loading.

The first strands 12 preferably have a high Young's modulus, greater for example than 250 GPa, and have as their function allowing satisfying the design criteria of the blade 3, and in particular the frequency status of the blade 3. These first strands 12 are therefore used in the weaving of the fibrous reinforcement 4 to form the portion of the reinforcement 4 (or first portion 13) which corresponds overall to the low and thick parts of the blade 3 (namely here the root 5 of the blade 3, the strut 6 and a lower portion of the airfoil 7) and the trailing edge 9 so that the natural frequencies of the blade 3 are high. This thus allows limiting or at least separating the frequency crossings between the first natural energy modes of the blade 3 and the engine harmonics. In one embodiment, only the first strands 12 are used as warp and weft yarns in the weaving of the first portion 13.

The second strands 14, for their part, the resistance at break of which is greater than that of the first strands 12, have as their function to limit the initiation and the propagation of damage to the blade 3 during the injection of objects, and particularly birds. These second strands 14 are therefore used in the weaving of the fibrous reinforcement 4 to form the portion of the reinforcement 4 (or second portion 15) which comprises all or part of the leading edge 8, in as much as this zone is strongly loaded in the event of objection ingestion, and in particular of large birds. Preferably, the elongation at break of the second strands 14 is comprised between 1.5 and 3 times the elongation at break of the first strands 12. In one embodiment, only the second strands 14 are used as warp yarns in the weaving of the second portion 15.

In order to optimize the resistance of the blade 3 to object impacts, the second strands 14 are warp strands of the reinforcement 4 (i.e. strands extending along the stacking axis Z of the blade 3 cross sections). In fact, damage (even the failure of the blade) are initiated in a Chordwise direction, the fissure being in the radial direction, so that the resistance of the reinforcement must be reinforced in the warp direction. Moreover, the second portion 15 preferably extends in the central portion of the blade 3 (which will be detailed hereafter in the description), at a distance from its lower part and from its tip 11.

The reinforcement 4 further comprises an intermediate portion 16 extending between the first portion 13 and the second portion 15 which is formed both by the first strands 12 and the second strands 14. In one embodiment, only the first and second strands 12, 14 are used as warp and weft yarns in the weaving of the intermediate portion 16.

This intermediate portion 16 is configured to serve as an interface between the first portion 13 and the second portion 15 in order to limit the fragility due to discontinuities of material. When the warp strands of the fibrous reinforcement 4 comprise only first strands 12 in the first portion 13 of the blade 3 and only second strands 14 in the second portion 15 of the blade 3, and the first portion 13 and the second portion 15 are end to end in the reinforcement 4, the blade 3 thus obtained actually allows avoiding damage to the blade 3 in the zones comprising the second strands 14. However, the applicant has taken notice of the fact that, in the absence of an intermediate portion 16, i.e. when abruptly introducing the second strands 14 and when simultaneously eliminating the first strands 12 at the interface between the first portion 13 and the second portion 15 of the fibrous reinforcement 4, the blade 3 obtained risked being strongly damaged at this interface in the event of an impact, because the interface between these two portions 11, 12 of the reinforcement 4 is made fragile by the strong discontinuity of the material properties.

The intermediate portion 16 thus allows making a transition between the material properties of the first portion 13 and the material properties of the second portion 15. To this end, the density of the second strands 14 is progressively increased within the intermediate portion 16, from the first portion 13 to the second portion 15. More precisely, at the interface between the first portion 13 and the intermediate portion 16, the density of the second strands 14 is very low while the density of the first strands 12 is very high. On the other hand, at the interface between the intermediate portion 16 and the second portion 15, the density of the second strands 14 is very high while the density of the first strands 12 is very low.

The second portion 15 extends over a portion of the chord length comprised between 10% and 50% of the total chord of the blade 3 at any point of the stacking axis Z of the blade 3. Preferably, the portion of the chord length is comprised between 20% and 40% of the total chord of the blade 3, for example on the order of 30%. What is meant here by chord is, for a given cross section of the blade 3 (and therefore for a given point on the stacking axis Z), the substantially axial straight line segment which connects the leading edge 8 to the trailing edge 9 of the blade 3.

As previously indicated, the second portion 15 extends in the central part of the blade 3, over only part of the height H of the airfoil 7. In one embodiment, the lower edge of the second portion 15 is at a distance (measured starting with the lower limit 10 of the blade 3) equal to at least 10% of the height H of the blade 7, preferably at a distance equal to approximately 35% of this height H. Moreover, the upper edge of the second portion 15 is at a distance (measured starting with the lower limit 10 of the blade 3) equal to at most 70% of the height H of the airfoil 7, preferably at a distance equal to approximately 65% of this height H.

In one exemplary embodiment, in order to optimize the resistance of the blade 3 to the impact of large birds, the lower edge 15a of the second portion 15 is at a distance equal to 30% of the height H of the airfoil 7 and its upper edge 15b at a distance equal to 65% of said height H (these distances being measured from the lower limit 10 of the blade 3). This exemplary embodiment allows both improving the behavior of the blade 3 in the event of ingesting large birds, but also facilitating its manufacture and limiting the additional unscrewing induced by the fact that the second strands 14 have a lower Young's modulus than the first strands 12.

Advantageously, the root 5 and the strut 6 including only the first strands (the second portion 15 extending a distance from the lower limit 10 of the blade 3), certification of the root 5/strut 6 zone of the blade 3 and manufacturing constraints are simplified.

In any case, the dimensioning of the blade 3 allows determining the distance starting at which second strands 14 are introduced into the fibrous reinforcement 4 in order to combine the necessary stiffness for frequency status (first strands 12) and elongation at break (second strands 14) for resistance to ingestion.

Figure 1:
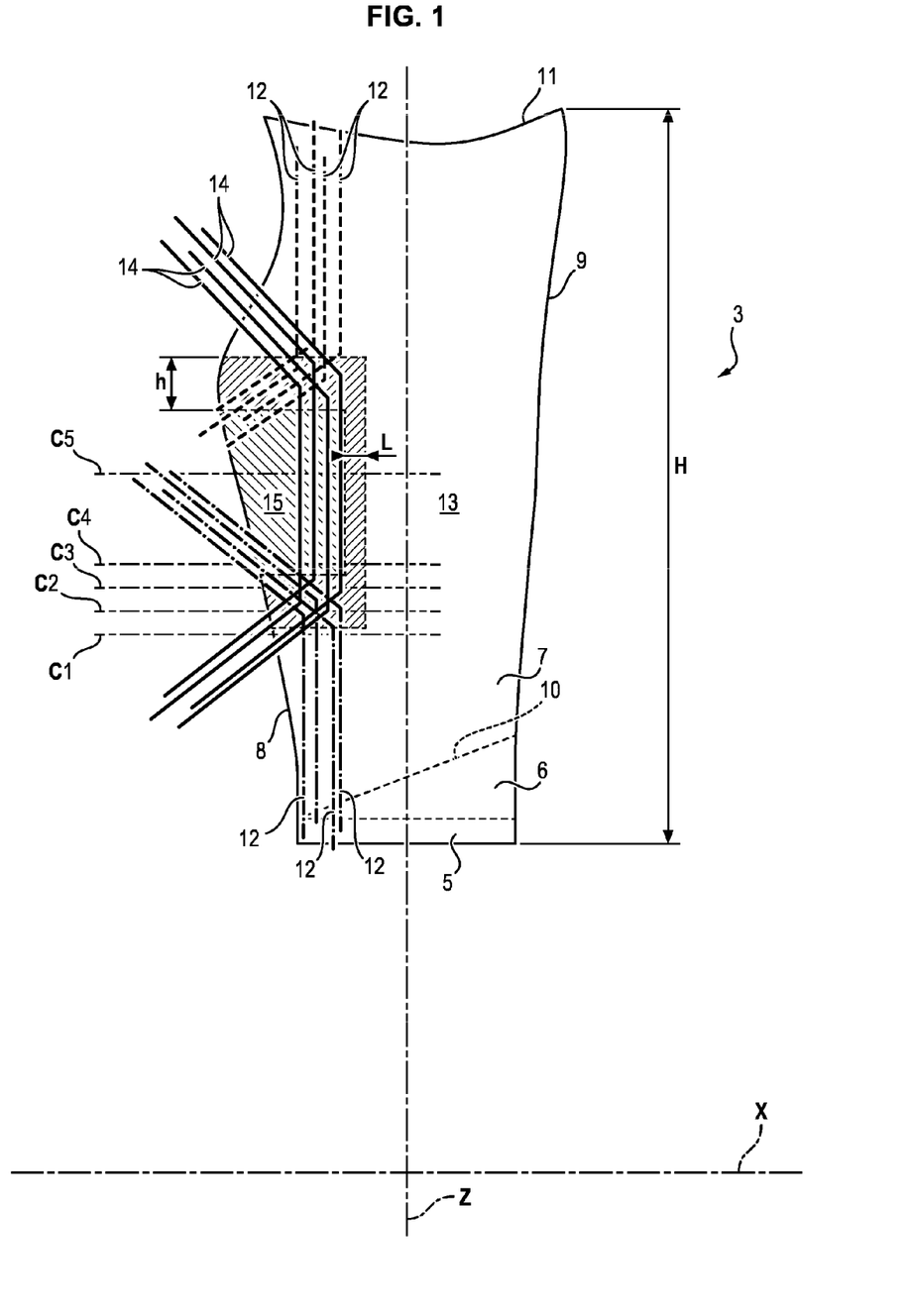
FIG. 1 is a schematic view showing an example of a fibrous reinforcement for a fan blade according to one embodiment, in which the introduction of second strands and the removal of first strands in the intermediate portion has been shown schematically, as well as five warp planes C1 to C5.

In one embodiment illustrated in FIG. 1, the lower 15a and upper 15b edges of the second portion 15 are parallel overall to the axis X of rotation of the fan, while its vertical edge 15c is parallel overall to the stacking axis Z.

Figure 5:
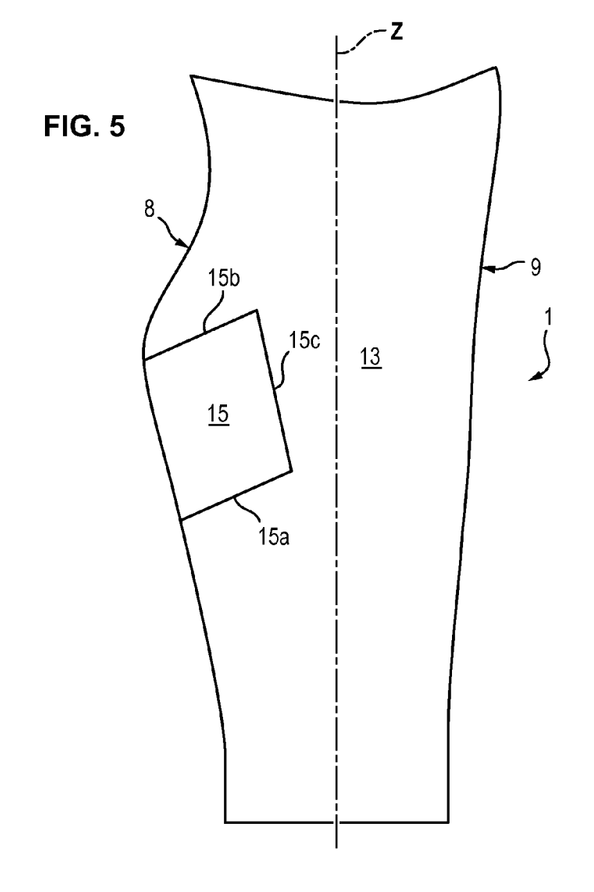
FIGS. 5 and 6 illustrate schematically variant embodiments of the shape of the second portion.
Figure 6:
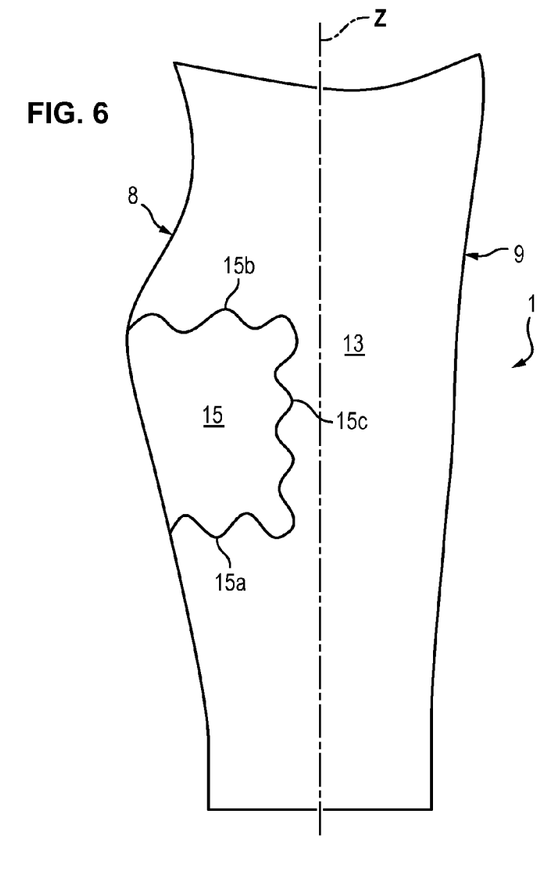

In a variant illustrated in FIGS. 5 and 6, the lower 15a and upper 15b edges of the second portion 15 are at least partly inclined relative to the axis X of rotation of the fan in order to avoid the transition between the second portion 15 and the first portion 13 being parallel to the axis of impact of the bird. For example, the lower 15a and upper 15b edges of the second portion can be substantially rectilinear and be inclined at an angle comprised between 10° and 20° relative to the axis X of the fan, either in the direction of the tip (as illustrated in FIG. 5), or in the direction of the root 5. In this manner, the crease formed by the impact of the bird is separated from the intermediate portion 16, which remains more fragile than the first portion 13 and the second portion 15 and therefore creates a preferred failure zone. In another example, the lower 15a and upper 15b edges of the second portion 15 can be corrugated (a substantially sinusoidal shape) (see FIG. 6). Alternatively, the edges 15a, 15b can be both inclined and corrugated.

If applicable, the vertical edge 15c of the second portion 15 can also be inclined relative to the stacking axis Z in order that this edge is not parallel to the warp yarns and thus reduced the impact of the introduction of the second strands 14 into the intermediate portion 16. Similarly, to the lower 15a and upper 15b edges, the vertical edge 15c can be rectilinear and/or corrugated and/or can be inclined by an angle comprised between 10° and 20° relative to the stacking axis Z.

The height h (dimension along the stacking axis Z) of the intermediate portion 16 is determined depending on the dimensioning of the blade 3, and therefore on the type of fan 1 and more generally of the turbomachine in which the fan 1 is intended to be integrated.

In one embodiment, the height h of the intermediate portion 16 (at the lower edge 15a and/or the upper edge 15b of the second portion 15) is comprised between 5% and 30% of the height H of the airfoil 7. Thus, the height h of the intermediate portion 16 can be comprised between one centimeter and ten centimeters. Moreover, the width L (dimension along the chord of the blade 3) of the intermediate portion 16 (at the vertical edge 15c of the second portion 15) is comprised between 5% and 50% of the height H of the airfoil 7. Thus, the width L of the intermediate portion 16 can be comprised between one centimeter and ten centimeters.

FIG. 1 shows schematically a blade 3 the fibrous reinforcement 4 of which has been formed based on a three-dimensionally woven fibrous preform, before the injection of resin or densification by a matrix and possible machining, in order to obtain a fan 1 blade 3 of composite material according to the invention. What is meant by three-dimensional weaving is that the warp strands follow sinuous trajectories in order to link together weft strands belonging to different layers of weft strands, with the exception of debonding sites, it being noted that three-dimensional weaving, particularly with an interlock weave pattern, can include surface 2D weaves. Different three-dimensional weave patterns can be used, such as interlock, multi-satin or multi-plain weaves, for example, as described in particular in document WO 2006/136755.

Five warp planes C1-C5 are shown in FIG. 1. A warp plane C1-C5 is a section view of the fibrous preform in a plane normal to the stacking axis Z. In the fibrous reinforcement 4, each warp plane C1, C2, C3, C4, C5 is separated from the immediately adjacent warp plane by one or more lines of weft strands.

Moreover, FIGS. 2a to 2d are top views of a portion of the warp planes C1, C2, C3, C4 of FIG. 1, in which only a few warp strands (i.e. strands of the fibrous reinforcement 4 extending along the stacking axis Z of the sections) are shown, the weft strands having been omitted in order to simplify the reading of the figures. These figures illustrate schematically an example of hybridization of the strands by the insertion of second strands 14 in the warp direction in the intermediate portion 16 which is adjacent to the lower edges 15a of the second portion 15.

Figure 2A:
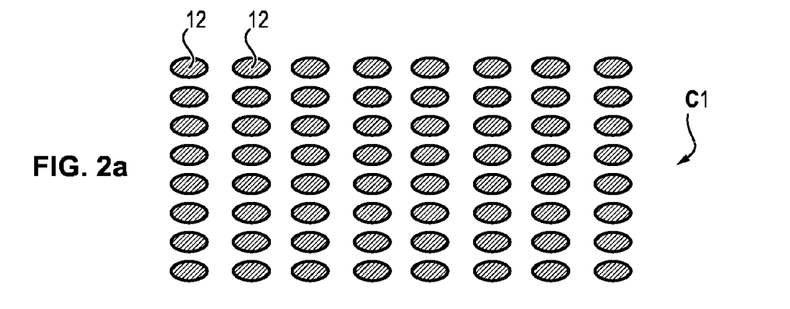
FIGS. 2a to 2d show schematically and partially the warp planes C1 through C4 shown in FIG. 1.
Figure 2B:
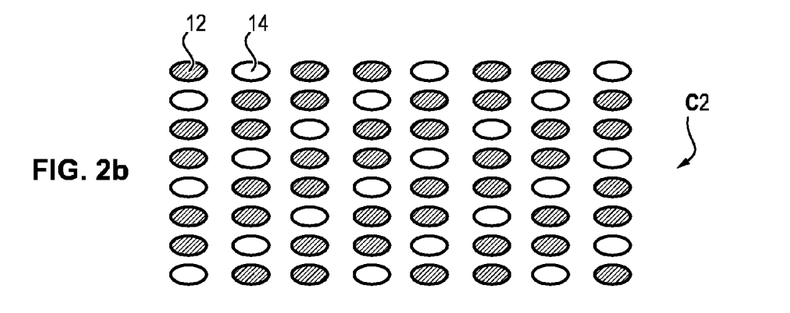
Figure 2C:
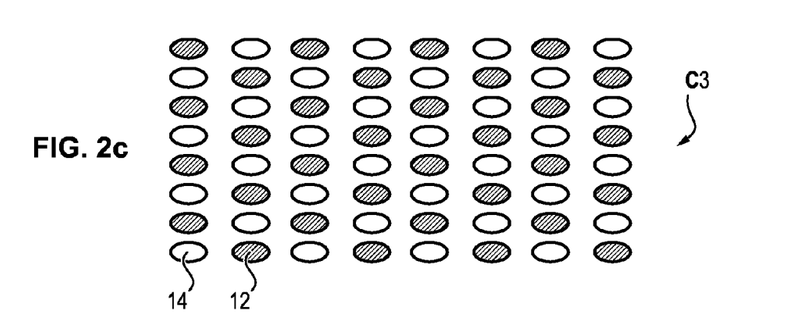
Figure 2D:
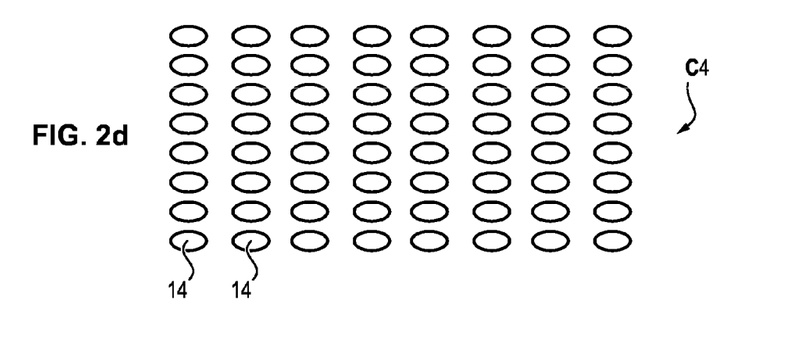

As can be seen in FIG. 2a, the first warp plane C1, which is part of the first portion 13 of the fibrous reinforcement 4, comprises only first strands 12. This first warp plane C1 is located at the interface with the intermediate portion 16 of the reinforcement 4.

The second warp lane C2 (FIG. 2b) forms part of the intermediate portion 16 of the fibrous reinforcement 4, in proximity to its interface with the first portion 13. This second warp plane C2 comprises two times more first strands 12 than second strands 14.

The third warp plane C3 (FIG. 2c) forms part of the intermediate portion 16 of the fibrous reinforcement 4, in proximity to its interface (which corresponds to the lower edge 15a) with the second portion 15. This third warp plane C3 comprises two times more second strands 14 than first strands 12.

The fourth warp plane C4 (FIG. 2d) forms a part of the second portion 15 of the fibrous reinforcement 4, at the interface 15 with the intermediation portion 13, and comprises only second strands 14.

The increase in density of second strands 14 can be accomplished by successively removing the first strands 12 from the weave of the preform, at the different warp lanes constituting the intermediate portion 16, by cutting them at the surface of the preform prior to injection and by simultaneously introducing the second strands 14 between these warp planes (see FIG. 1). In this manner, the first portion 13, the second portion 15 and the intermediate portion 16 are formed in a single piece during weaving.

Figure 3:
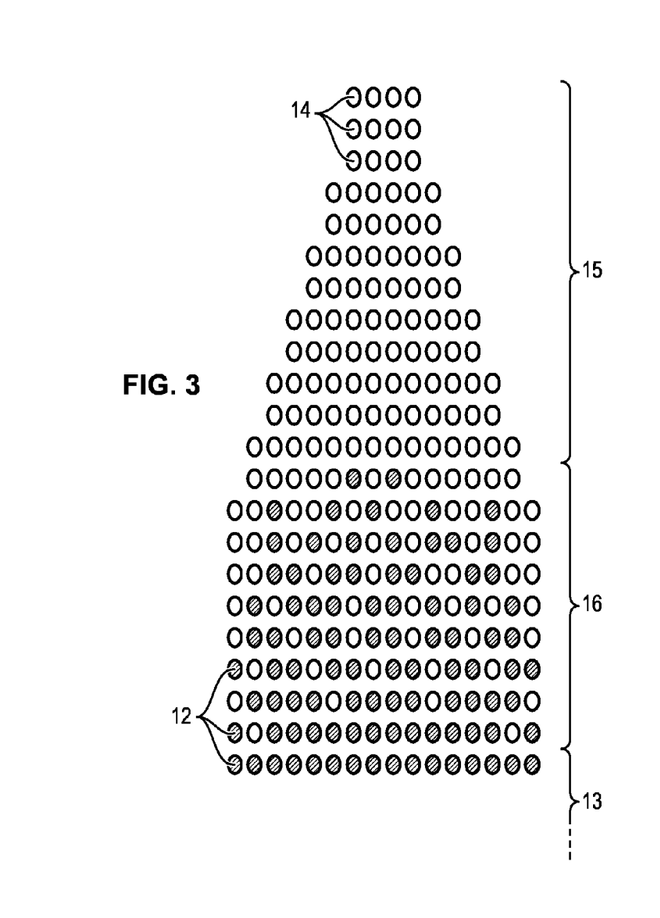
FIGS. 3 and 4 show schematically and partially examples of variation of the warp plane C5 shown in FIG. 1 which cuts the second portion of the reinforcement.

FIG. 3 is a partial top view of the warp plane C5 of FIG. 1, which partially cuts the second portion 15, the intermediate portion 16 and the first portion 13, and illustrates schematically an example of hybridization of the strands by the insertion of second strands in the warp direction in the part of the intermediate portion 16 which is adjacent to the vertical edges 15c of the second portion 15. Here too, in order to simplify the figure, only the warp strands are illustrated. This partial view illustrates schematically the progressive transition in the axial direction (chord direction), with a density of second strands 14 which increases progressively in the direction of the second portion 15. In this exemplary embodiment, the second portion extends over the entire thickness of the blade 3 and forms at least in part the pressure side wall I and the suction side wall E.

In a variant, the second portion 16 does not extend over the entire thickness of the blade 3. In fact, it has been observed that damage has a tendency to be initiated on the pressure side wall I of the blade 3. Consequently, in this variant embodiment, the second portion 15 of the fibrous reinforcement forms a portion at least of the pressure side wall I of the blade 3, but does not form the suction side wall E of the blade. In other words, the pressure side wall I is formed of second strands 14 while the section side wall E comprises first strands 12. If applicable, the suction side wall E can be formed exclusively of first strands 12.

Figure 4:
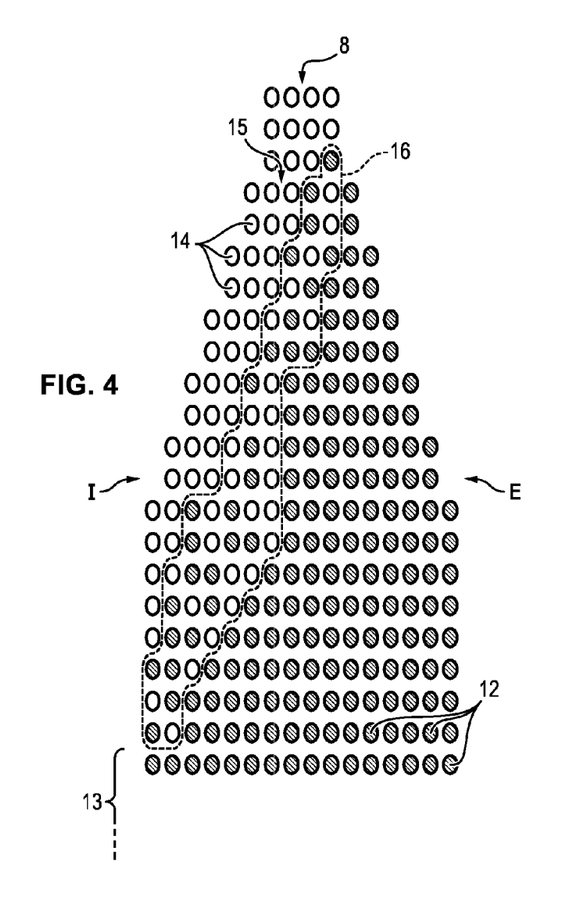

FIG. 4 is a partial top view of the plane C5 of FIG. 1 according to this variant embodiment. As for FIG. 3, this figure illustrates the hybridization of the strands by the insertion of second strands 14 in the warp direction in the part of the intermediate portion 16 which is adjacent to the vertical edge 15c of the second portion 15, and only the warp strands are illustrated. However, as can be seen in FIG. 4, the second portion 15 does not extend until the suction side wall E. This partial view illustrates schematically the progressive transition in the axial direction (chord direction) and transverse direction (in the thickness of the blade 3), with a density of second strands 16 which increases progressively in the direction of the suction side wall E and of the trailing edge 9.

Generally, in order to ensure the transition of the mechanical properties between the first portion 13 and the second portion 15 of the reinforcement 4 within the intermediate portion 16, the percentage (relative to the total number of warp strands of the column) of second strands 14 introduced between two immediately adjacent columns of warp strands of the intermediate portion 16 is at most equal to 30%. Preferably, this percentage is comprised between 5% and 15%.

In the part of the intermediate portion which extends at the lower edge 15a or at the upper edge 15b, at most 30% of the warp strands are modified between two immediately adjacent (i.e. separated only by one line of weft strands) warp planes. Thus, between two successive warp planes (and immediately adjacent in the fibrous reinforcement 4), at most 30% of the first strands 12 are removed from the fibrous preform forming the fibrous reinforcement 4 and cut out at the surface, and as many second strands 14 are introduced into the fibrous preform from the surface in order to replace the removed first strands 12. Preferably, in this part of the intermediate portion 16, between 5% and 15% of the warp strands are modified between two immediately adjacent warp planes.

Likewise, in the vertical part of the intermediate portion 16 at the vertical edge 15c, 30% at most of the warp strands are modified between two immediately adjacent (i.e. separated by only one column of warp strands) weft planes. Thus, between two successive (and immediately adjacent in the fibrous reinforcement 4) weft planes, at most 30% of the first strands 12 are removed from the fibrous preform forming the fibrous reinforcement 4 and cut out at the surface, and as many second strands 14 are introduced into the fibrous preform from the surface in order to replace the removed first strands 12. Preferably, in this part of the intermediate portion 16, between 5% and 15% of the warp strands are modified between two immediately adjacent weft planes.

In one embodiment, the first strands have a high Young's modulus E, i.e. greater than 250 GPa, preferably greater than 270 GPa. Their elongation at break A is moreover comprised between 1.5% and 2.5%.

For example, the first strands 12 can comprise carbon fibers, typically HS* T300 (E=284 GPa, A=1.5%), HS TR30S (E=356 GPa, A=1.9%) or HS T700 (E=395 GPa, A=2.1%) carbon fibers or even high-modulus aramid fibers of the DuPont Kevlar 49 (E=302 GPa, A=2.4%) type.

The second strands 14 can then have an elongation at break comprised between 3% and 6%, preferably between 4% and 5%. For example, the second strands 14 can comprise glass fibers, typically glass fibers of the E-GLASS type (E=165 GPa, A=4.4%) or glass fibers of the S-2 GLASS type (E=267 GPa, A=5.2%), or basalt fibers (E=227 GPa, A=3%) or even polyester fibers (E=268 GPa, A=3.5%).

Generally, the configurations described are valid for engines the fan of which can have an outer diameter on the order of 1.8 meters to 3 meters. The number of blades of the fan can be equal to 16 or 18. Regardless of the diameters of the fan, the number fan blades will be reduced as much as possible. Among different criteria, a selection of parameters (particularly of the distance h1) will depend more particularly on the behavior of the fan blade and on the combination "frequency/dimensioning in ingestion." In fact, for the same target engine, it is possible to select different frequency behavior strategies or frequency responses in different ingestion cases, for example to postpone the responses of blade and blading by avoiding vibrational crossings with the energetic harmonics of the engine. For example, it is possible to make selections so as to position these crossings at transient engine speeds.

Hybridization of the strands of the fibrous reinforcement 4 further allows opening the design field due to the additional contribution of mechanical resistance. For example, it becomes possible to refined the profile of the blade 3 at the leading edge of the preform 4 or of the trailing edge of the preform 4 or over the entire height H of the airfoil 7 in comparison with a blade 3 comprising only the first strands 12 (with a high Young's modulus), which allows optimizing the mass of the blade 3 and the aerodynamic performance of the fan 1 (by obtaining finer profiles or by reducing the hub ratio, which is linked to the reduction of centrifugal force induced by the mass of the blade 3).

The invention claimed is:

1. A fan blade of a turbomachine comprising a structure of composite material comprising a fibrous reinforcement obtained by three-dimensional weaving of strands and a matrix in which the fibrous reinforcement is embedded;
   wherein the structure of composite material comprises a leading edge, a trailing edge, an airfoil with an aerodynamic profile configured to extend in an airflow, a root configured to be attached to a fan disk and a strut extending between the root and the airfoil;
   wherein the fibrous reinforcement comprises a first portion forming the trailing edge, a second portion forming at least part of the leading edge, and a third portion extending between the first portion and the second portion;
   wherein the strands of the fibrous reinforcement comprise first strands having a predefined elongation at break and second strands having an elongation at break greater than the predefined elongation at break of the first strands, the first portion comprising all or part of the first strands, the second portion comprising all or part of the second strands and a density of the second strands increasing progressively in the third portion from the first portion towards the second portion;
   wherein the first and second strands comprise warp strands distributed so as to form warp columns; and
   wherein percentage, with respect to a total number of warp strands in a warp column of the third portion, of second strands introduced between two columns of immediately adjacent warp strands in the third portion is equal at most to 30%.

2. The fan blade according to claim 1, wherein the first portion is deprived of second strands and the second portion comprises warp strands and weft strands and the warp strands of the second portion are deprived of first strands.

3. The fan blade according to claim 1, wherein the second portion extends at a distance from the tip of the fan blade.

4. The fan blade according to claim 1, wherein the second portion forms the leading edge over at least part of a height of the airfoil.

5. The fan blade according to claim 4, wherein the second portion extends over at least 35% of the height of the airfoil.

6. The fan blade according to claim 4, wherein the second portion extends over a distance comprised between 35% and 100% of the height of the airfoil.

7. The fan blade according to claim 1, wherein the third portion extends over a distance comprised between 5% and 30% of the height of the airfoil.

8. The fan blade according to claim 1, further comprising a plurality of warp planes cutting the warp columns, each warp plane being separated from an immediately adjacent warp plane by a line of weft strands, at most 30% of the warp strands being modified between two immediately adjacent warp planes in the third portion.

9. The fan blade according to claim 1, further comprising a pressure side wall and a suction side wall, wherein the second portion of the reinforcement forms at least partly the pressure side wall and the suction side wall does not comprise second strands.

10. The fan blade according to claim 1, wherein the second portion extends over a portion of the chord length comprised between 10% and 50% of a total chord length of the fan blade.

11. The fan blade according to claim 1, wherein the first strands have a Young's modulus greater than a Young's modulus of the second strands.

12. The fan blade according to claim 1, wherein the elongation at break of the second strands is comprised between 1.5 and 3 times the predefined elongation at break of the first strands.

13. The fan blade according to claim 1, wherein the first strands comprise carbon fibers or aramid fibers having a Young's modulus greater than 250 GPa, and the predefined elongation at break of the first strands is comprised between 1.5% and 2.5%.

14. The fan blade according to claim 1, wherein the elongation at break of the second strands is comprised between 3% and 6%.

15. The fan blade according to claim 14, wherein the second strands comprise glass fibers or basalt fibers.

16. The fan blade according to claim 1, wherein the second strands comprise warp yarns.

17. A fan for a turbomachine comprising fan disk and a plurality of fan blades according to claim 1, each fan blade being attached to the fan disk.

18. The fan blade of claim 1, wherein the percentage is comprised between 5% and 15%.

19. The fan blade according to claim 1, further comprising a plurality of warp planes cutting the warp columns, each warp plane being separated from an immediately adjacent warp plane by a line of weft strands, wherein, in the third portion, between 5% and 15% of the warp strands are modified between two immediately adjacent warp planes.

20. The fan blade according to claim 1, wherein the second portion extends over a portion of the chord length comprised between 20% and 40% of a total chord length of the fan blade.

* * * * *